United States Patent
Denoual et al.

(10) Patent No.: US 7,426,305 B2
(45) Date of Patent: Sep. 16, 2008

(54) METHODS FOR SENDING AND RECEIVING AN ANIMATION, AND ASSOCIATED DEVICES

(75) Inventors: Franck Denoual, Saint Domineuc (FR); Xavier Henocq, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 11/049,978

(22) Filed: Feb. 4, 2005

(65) Prior Publication Data
US 2005/0180646 A1    Aug. 18, 2005

(30) Foreign Application Priority Data
Feb. 9, 2004    (FR)    ............................... 04 01221

(51) Int. Cl.
*G06K 9/36* (2006.01)
*H04N 7/18* (2006.01)
*G06K 9/46* (2006.01)

(52) U.S. Cl. .................... 382/233; 375/240.01
(58) Field of Classification Search ............... 382/232, 382/233, 254, 284, 288–300; 375/240.01, 375/240.11, 240.12, E7.078, E7.09, E7.011; 709/223.231; 711/141; 725/86, 87; 348/E7.063
See application file for complete search history.

(56) References Cited

U.S. PATENT DOCUMENTS

| | | | |
|---|---|---|---|
| 4,794,447 A * | 12/1988 | Tsinberg ................. | 375/240.25 |
| 6,501,797 B1 | 12/2002 | van der Schaar et al. ................. | 375/240.12 |
| 6,697,426 B1 | 2/2004 | Van Der Schaar et al. ................. | 375/240.01 |
| 2002/0076120 A1 * | 6/2002 | Loce et al. ................. | 382/300 |
| 2003/0002579 A1 | 1/2003 | Radha et al. ................. | 375/240 |
| 2003/0229900 A1 * | 12/2003 | Reisman ................. | 725/87 |
| 2004/0062304 A1 | 4/2004 | Dolbear et al. ................. | 375/240.1 |

(Continued)

FOREIGN PATENT DOCUMENTS

WO    WO 01/03441    1/2001

(Continued)

OTHER PUBLICATIONS

Taubman, D., "Remote Browsing Of JPEG2000 Images", IEEE Proceedings 2002 International Conference On Image Processing, ICIP 2002, Rochester, N.Y., Sep. 22-25, 2002, vol. 1, pp. 229-232.

(Continued)

*Primary Examiner*—Amir Alavi
(74) *Attorney, Agent, or Firm*—Fitzpatrick, Cella, Harper & Scinto (57) ABSTRACT

The invention has a sending device and a decoding device, where the sending device sends via a transmission channel to the decoding device at least one key image during a first time interval and a secondary image calculated using the at least one key image during a second time interval. The at least one key image is defined at least partly by base data and the secondary image is defined by secondary data. The sending device sends the base data to the decoding device during the first time interval, determines enhancement data for the at least one key image according to an available bandwidth of the transmission channel and the amount of secondary data to be transmitted, and sends the secondary data and the enhancement data for the at least one key image to the decoding device during the second time interval.

19 Claims, 8 Drawing Sheets

U.S. PATENT DOCUMENTS

| | | | |
|---|---|---|---|
| 2005/0021726 A1 | 1/2005 | Denoual | 709/223 |
| 2005/0105808 A1 | 5/2005 | Labelle | |
| 2005/0198676 A1 | 9/2005 | Henocq et al. | 725/86 |
| 2006/0036813 A1 | 2/2006 | Henocq et al. | 711/141 |

FOREIGN PATENT DOCUMENTS

| | | |
|---|---|---|
| WO | WO 01/69935 | 9/2001 |
| WO | WO 02/05563 | 1/2002 |
| WO | WO 03/034741 | 4/2003 |

OTHER PUBLICATIONS

Radha H. et al., "Scalable Internet Video Using MPEG-4", Signal Processing. Image Communication, Elsevier Science Publishers, Amsterdam, NL, vol. 15, No. 1-2, Sep. 1999, pp. 95-126.

Jian Zhou et al., "FGS Enhancement Layer Truncation With Minimized Intra-Frame Quality Variation", IEEE, vol. 2, Jul. 6, 2003, pp. 361-364.

Nick Feamster, et al., "Packet Loss Recovery for Streaming Video". M.I.T. Laboratory for Computer Science, Cambridge, MA 02139. http://nms.lcs.mit.edu/projects/videocm/2000.

"Coding of Still Pictures", ISO/IEC JTC 1/XC 29/WG 1 (ITU-T SG16), Oct. 24, 2002.

"JPEG 2000 Image Coding System", JPEG 2000 Part 1 Final Draft International Standard, Aug. 18, 2000.

\* cited by examiner

METHODS FOR SENDING AND RECEIVING AN ANIMATION, AND ASSOCIATED DEVICES

This application claims priority from French patent application No. 04 01221 filed on Feb. 9, 2004, which is incorporated herein by reference.

FIELD OF THE INVENTION

The invention concerns the transmission of information which describes an animation, in particular on a network with variable bandwidth.

BACKGROUND OF THE INVENTION

Animation generally designates one (or more) moving images to be displayed on a screen, for example a computer screen. The animation is normally defined as a sequence of fixed images, whose regular renewal at a frequency above the sensitivity of the human eye makes it possible to simulate a movement.

In order to limit the amount of information necessary for coding these animations (in particular for their storage or transmission), it has already been proposed to completely code (according to a given algorithm) only a first part of these images (key images). For the remaining images (secondary images), there is kept (for storage or transmission) only secondary data, which allow the restoration of the initial image only with knowledge of a neighboring key image. This drawback is compensated for by the reduced size of the secondary data. Such an approach is for example used by the MPEG (Moving Picture Expert Group) standard.

It is naturally wished to transmit such animations (or sequences of images) in order to distribute them with a view to their display by one or more end users. The transmission means used has, however, a limited, and sometimes even variable, bandwidth. This is, for example, true in the case of the Internet on which the exchange of animations is expanding, especially nowadays.

It is often preferable for the user to be able to display the transmitted animation in real time or with as slight a delay as possible. In certain applications, display in real time (or almost real time) is even necessary for implementing the desired service with an acceptable quality. This is for example the case for videophone type systems in which the exchanged images of the communicating parties constitute animations.

In order to obtain a display without a sizeable delay at the end user, it has already been proposed to adapt the amount of transmitted data to the bandwidth available at transmission time. To do this, the data to be sent is first put into a hierarchy, then only part of the data (base data) or the whole of the data (base data and enhancement data), according to the available bandwidth, is transmitted. Such a solution is for example described in the patent application WO 01/03 441.

SUMMARY OF THE INVENTION

This solution however takes into account only the bandwidth available at the time of transmission of the hierarchical data. This is particularly prejudicial in the case where a coding of the key images/secondary images type is used. This is because, according to this technique, the transmission of a key image is frequently limited to its base data, on account in particular of the relatively large size of the data which completely describe the key image. The quality of the set of secondary images which are associated with this key image, and are therefore calculated using this key image, is thus reduced, while the transmission of the secondary images does not in general use all the available bandwidth.

In order to remedy this drawback, the invention proposes a method for sending (e.g. on a transmission channel having a bandwidth) at least one key image to be transmitted during a first time interval and a secondary image calculated using said at least one key image and to be transmitted during a second time interval, said at least one key image being defined at least partly by base data and the secondary image being defined by secondary data, comprising the following steps:
- sending the base data during the first time interval;
- determining enhancement data for said at least one key image according to an available bandwidth (e.g. the bandwidth available on the transmission channel) and the amount of secondary data to be transmitted;
- sending the secondary data and the enhancement data for said at least one key image during the second time interval.

Correlatively, the invention also proposes a device for sending at least one key image to be transmitted during a first time interval and a secondary image calculated using said at least one key image and to be transmitted during a second time interval, said at least one key image being defined at least partly by base data and the secondary image being defined by secondary data, comprising means for sending the base data during the first time interval, means for determining enhancement data for said at least one key image according to an available bandwidth (e.g. the bandwidth available on the transmission channel) and the amount of secondary data to be transmitted and means for sending the secondary data and the enhancement data for said at least one key image during the second time interval.

Thus, the enhancement data transmitted during the second interval supplement the definition of the key image, which makes it possible to obtain a better quality secondary image. Moreover, the transmission channel is better used by virtue of the transmission of the enhancement data in the part left free by the relatively small size of the secondary data. The use of the transmission channel is thus optimized.

According to one implementation option, the method comprises the following steps:
- estimating the available bandwidth of said channel during the first time interval in order to determine a first amount of data to be transmitted;
- extracting the base data of said at least one key image so that the size of the base data is less than or equal to said first amount.

The base data are thus exactly adapted to the bandwidth available at the time of their transmission.

In practice, the extraction of the base data can be carried out by the following steps:
- selecting, by means of a table containing the size of the base data as a function of at least one parameter, at least one value of the parameter such that the size associated by the table is less than or equal to said first amount;
- extracting the base data using at least said value.

This solution allows easy selection of the base data.

The sending method can comprise the following steps:
- estimating the available bandwidth of said channel during the second time interval in order to determine a second amount of data to be transmitted;
- determining the available data budget by subtracting the size of the secondary data from said second amount;
- extracting the enhancement data for said at least one key image so that the size of the enhancement data is less than or equal to the available budget.

The enhancement data transmitted are thus exactly adapted to the available bandwidth.

The first time interval and the second time interval can have equal or substantially equal durations.

The secondary data can consist of interpolation parameters.

When two key images have to be transmitted successively, provision can be made that a first key image and a second image are transmitted during the first time interval.

In certain cases, the first key image is intended to be displayed at a first instant, the second key image is intended to be displayed at a second instant, and the secondary image is intended to be displayed at a third instant. If the second instant is separated from the first instant by a first duration and the third instant is separated from the first instant by a second duration smaller than the first duration, provision can be made that first enhancement data relating to the first key image and second enhancement data relating to the second key image are determined so that the size ratio between the first and second enhancement data depends on the ratio of the second duration to the first duration.

Thus, the improvement in the quality of the key images is adapted as well as possible to the moment when these key images have an effect on the secondary image in the process of being decoded.

The key images and the secondary images in general define an animation.

In this case, provision can be made that the animation comprises several secondary images between the first key image and the second key image.

The images are for example multi-resolution images with several quality levels. The images are for example images in the JPEG 2000 format. Their transmission can be carried out according to the JPIP protocol.

The invention also proposes a method for decoding at least one key image and a secondary image comprising the steps of:
  during a first time interval, receiving base data defining said at least one key image;
  decoding the base data so as to generate a first version of said at least one key image;
  during a second time interval, receiving enhancement data for said at least one key image and secondary data defining the secondary image using said at least one key image;
  combining the base data and the enhancement data into enhanced data;
  decoding the secondary data so as to generate said secondary image using the enhanced data.

Correlatively, the invention proposes a device for decoding at least one key image and a secondary image, comprising:
  means for receiving, during a first time interval, base data defining said at least one key image;
  means for decoding the base data so as to generate a first version of said at least one key image;
  means for receiving, during a second time interval, enhancement data for said at least one key image and secondary data defining the secondary image using said at least one key image;
  means for combining the base data and the enhancement data into enhanced data; and
  means for decoding the secondary data so as to generate said secondary image using the enhanced data.

Thus, the quality of the secondary image is not limited by the bandwidth at the moment of transmission of the key image, but can be supplemented by the enhancement data transmitted during the second interval.

According to one implementation option, and in order in particular to provide a display in real time, the method described above comprises a step of displaying said first version, which step occurs shortly after the step of decoding the base data, for instance between the steps of decoding the base data and combining the base data and the enhancement data.

According to another implementation option, possibly compatible with the preceding one, the method comprises a step of decoding the enhanced data so as to generate a second version of said at least one key image, and the decoding of the secondary data so as to generate said secondary image is based on said second version.

The invention also proposes an information storage means which can be read by a computer or a microprocessor, containing instructions of a computer program for executing the steps of one of the methods mentioned above.

The invention also proposes a partially or totally removable information storage means which can be read by a computer or a microprocessor, containing instructions of a computer program for executing steps of one of the methods mentioned above.

The invention also proposes a computer program which can be loaded into a programmable apparatus, characterized in that it comprises instruction sequences or portions of software code for implementing the steps of one of the above methods.

As the advantages relating to the sending, receiving and decoding devices, the information storage means and the computer program are the same as those relating to the sending, receiving and decoding methods briefly described above, they will not be repeated here.

BRIEF DESCRIPTION OF THE DRAWINGS

Other characteristics and advantages of the invention will emerge in the light of the following description, given with reference to the accompanying drawings, in which.

DETAILED DESCRIPTION OF EMBODIMENTS

Figure 1:
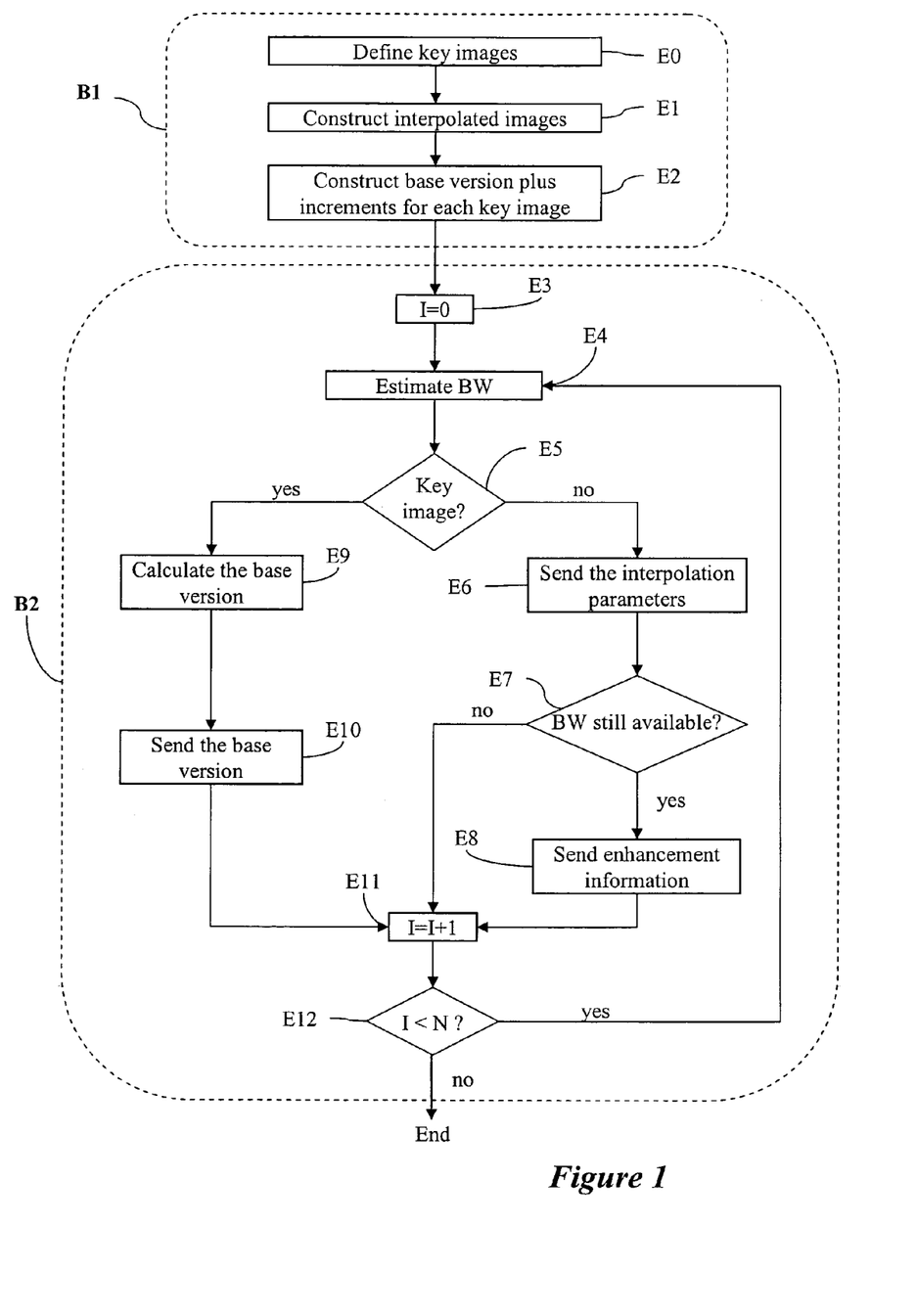
FIG. 1 describes the main steps of one embodiment of the invention.

FIG. 1 describes the main steps of an image transmission method in accordance with the invention.

For this embodiment, the example is taken of an animation offering a video sequence timed at a frequency equal to F images per second. This sequence comprises N images (numbered from 0 to N-1 for reference) and consists of a number of key images Nc encoded according to the format of the JPEG 2000 standard. The secondary images situated between two key images are constructed by interpolation using these two key images. D(I) designates the number of bits necessary for representing the image I with I $\in[0,N[$. Each compressed image in the JPEG 2000 format can be coded according to a so-called multi-resolution scheme where the resolution R varies between 0 and $R_{max}$. According to the JPEG 2000 standard, $R_{max} \leq 32$. Moreover, a compressed image in the JPEG 2000 format has several quality levels Q between 0 and $Q_{max}$, with, in accordance with the JPEG 2000 standard, $Q_{max} \leq 2^{16}$.

Such an animation can be obtained, for example, using the Macromedia Flash MX tool or any other equivalent tool allowing the creation and editing of multimedia content. It is then considered that the creator of the animation can import images of the type of compressed images in the JPEG 2000 format, in order to have them available for creating his animation.

For each imported image, he defines a resolution and a quality level at which he wishes to see it appear in his animation. He can also consider only a part of the image specified by a rectangular spatial zone. These resolution and quality levels defined by the user, which will be designated respectively Rumax and Qumax, are the values taken into account during implementation of the invention and are bounded respectively by $R_{max}$ and $Q_{max}$.

The method described as an example in FIG. 1 comprises steps which can be carried out without needing a connection to the image transmission channel (represented by the block B1) and steps for which the connection to the transmission channel is necessary (represented by the block B2).

The first steps (E0 to E2) do not require a connection to the transmission channel and therefore form part of the block B1 in FIG. 1.

In an initial step E0, key images are defined, that is to say images of the animation which are fully defined by the data which represent them without requiring reference to another image. Naturally, the other images of the animation are defined in the same way as secondary images, that is to say images which require for their decoding the data relating to at least one neighboring key image. In the example described here, the key images are for example digital images encoded according to the JPEG 2000 format.

During the following step E1, there are determined the secondary data which will make it possible to code the secondary images with reference to the key images. Here, the secondary images are interpolated images and the secondary data are thus interpolation parameters. The interpolation parameters are naturally memorized for example by storage in a random access memory or in another storage means such as a hard disk.

The example of FIG. 1 also proposes a step E2 of constructing a table, which will be detailed hereinafter with reference to FIG. 2. Essentially, this table makes it possible to simplify determination of the data to be sent on the transmission channel at subsequent steps.

There will now be described the steps of the block B2, that is to say those which require the connection of the sending apparatus to the image transmission channel. As before, the index I describes the image of the animation in the course of being processed.

During the step E3, the image index I is initialized to zero.

At the following step E4, the bandwidth of the transmission channel is estimated. With this aim, the sending apparatus (which is for example a server) can measure the packet loss rate which has occurred during the preceding exchanges.

Control then passes to the step E5, in which it is determined if the image under consideration is a key image by means of the index I. If the image under consideration is a key image, control passes to the step E9. In the contrary case, control passes to the step E6.

If it is a key image, the best representation of the key image which can be transmitted during a given first time period (equal to 1/F) with the bandwidth estimated above will be determined. This representation will constitute base data which at least partially define the key image.

In concrete terms, this determination is carried out at the step E9 in which a base version of the key image is calculated; the size of the base version of the key image will allow it to be entirely transported on the transmission channel in the first time period indicated above.

Once the base version has been determined, it is sent on the transmission channel at the step E10, by sending the corresponding base data.

The step E10 is followed by the step E11 during which the index of the processed image is incremented.

Control then passes to the step E12, during which it is checked if there still remain images to be transmitted by comparing the index I with the total number of images N.

If this is the case (I<N), the already described bandwidth estimation step E4 is returned to. On the contrary, if the image processed was the last image of the animation (I=N), the sending procedure is terminated.

In the case where the step E5 determines that the image processed is not a key image, then control passes to the step E6. The step E6 consists of sending the interpolation parameters which represent the interpolated image in progress (that is to say sending the secondary data which represent the secondary image in progress) during a second time period.

Control then passes to the step E7 during which it is checked if the transmission channel still has bandwidth available during the second time period, that is to say the sending of the secondary data (or interpolation parameters) has not occupied the entire estimated bandwidth for this second time period.

If no available bandwidth remains, control passes to the previously described image index incrementing step E11.

On the other hand, if bandwidth is available during the second time period, the bandwidth remaining (i.e. still available) deltaBW is evaluated and then control passes to the step E8.

During the step E8, enhancement information for the key image is sent on the transmission channel. To do this, the enhancement data, that is to say the data which will supplement the definition of the key image with respect to the previously sent base data, will first be determined. The enhancement data are, for example, chosen according to the bandwidth remaining during the second time period, that is to say according to the bandwidth estimated during the step E4 at which the bandwidth necessary for transmitting the secondary data or interpolation parameters was subtracted.

The method for determining the enhancement data used in the present example will be detailed later with reference to FIG. 4.

When the enhancement data have thus been determined, they are sent on the transmission channel during the second time period, during which the secondary data have already been sent.

The step E8 is next followed by the previously mentioned step E11 which consists of incrementing the image index.

Figure 2:
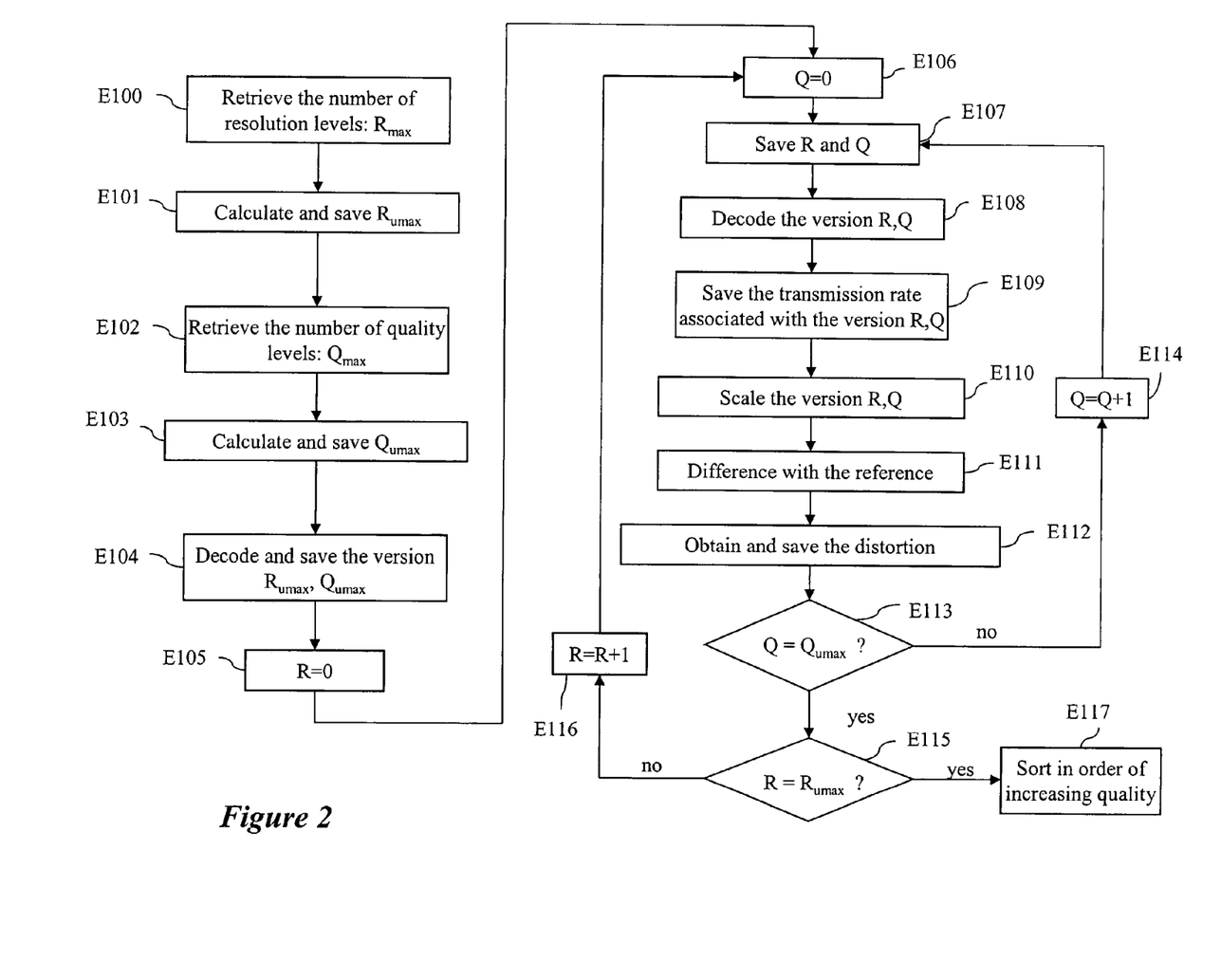
FIG. 2 describes within this context a procedure for initializing a data table.

FIG. 2 describes in detail the step E2 of initializing the previously mentioned table. This table lists, for the different representations of the key image it is possible to obtain, the size of the data representing the key image according to this representation. Hereinafter, "version" will designate one particular representation of the key image. For this reason, the table mentioned above will be called a version table.

At the step E100, the number of resolution levels in which the key image has been encoded is retrieved. This step is, for example, carried out by decoding the headers of the image under consideration which has been compressed in the JPEG 2000 format. Hereinafter, the number of resolution levels thus obtained will be referred to as $R_{max}$. In general, this number is between 0 and 32.

At the following step E101, the resolution level for the key image it is wished to transmit is calculated. For example, if the original image has a height $h_{max}$ in terms of pixels and it is wished to transmit a key image with a height $h_{umax}$, the resolution finally used $R_{umax}$ will be given by the following formula:

$$R_{u\,max} = R_{max} - \log_2\left(\frac{h_{max}}{h_{u\,max}}\right)$$

Naturally, in order to keep an integer resolution level, the height $h_{umax}$ is the height expressed as the power of two closest to the desired height.

At the step E102, the number of quality levels $Q_{max}$ in the original image is retrieved. At the following step E103, the level $Q_{umax}$ it is wished to use is determined. This data is for example entered by the user who wishes to send the animation on the transmission channel.

At the step E104, the version of the key image obtained with a resolution $R_{umax}$ and a quality level $Q_{umax}$, and which is denoted i($R_{umax}$, $Q_{umax}$), is decoded and then saved. It is the most complete representation of the key image it is wished to transmit on the transmission channel.

Hereinafter, different versions of the key image will be obtained for a resolution and quality lower than the representation which has just been mentioned.

At the step E105 which follows the step E104, the current resolution is initialized to zero (R=0).

At the step E106 which follows the step E105, the current quality is initialized to zero (Q=0).

During the following step E107, the current resolution R and the current quality Q are saved in the version table.

At the following step E108, decoding of the key image is carried out with, as parameters, the current resolution R and the current quality Q. The size of the data necessary for representing the key image with these parameters can thus be easily obtained.

This size is saved in the version table in association with the corresponding resolution R and quality Q parameters (step E109).

Naturally, the size information can be saved in the form of a transmission rate since the data must be transmitted in a time period equal to 1/F.

After the step E109, a scaling of the image obtained with the current resolution parameter R and current quality parameter Q is carried out during the step E110.

Thus, at the step E11, this image can be compared with the original image in its version to be transmitted (resolution $R_{umax}$ and quality $Q_{umax}$).

A measurement will then be easily obtained (step E112) of the distortion created through the use of a quality Q and resolution R lower than the maximum possible. The distortion will be saved in the version table in association with the current resolution R and the current quality Q.

After the step E112, a change is made to higher quality and resolution values. To do this, at the step E113, it is checked if the current quality Q has reached the maximum quality for transmission $Q_{umax}$.

If this is not the case, the current quality is incremented at the step E114, and then the forming of the version table is resumed at the already described step E107.

If, on the contrary, the current quality has reached the maximum quality used for transmission $Q_{umax}$, a change is made to the next resolution.

To do this, at the step E115, it is checked that the maximum resolution has not been reached. If the current resolution is not the maximum resolution $R_{umax}$, control passes to the current resolution incrementing step E116, and then the already described step E106 in which the current quality is initialized again in order to form the version table for the new current resolution.

Returning to the step E115, if the resolution $R_{umax}$ has been reached, the next step is the step E117 during which the versions are sorted in order of increasing quality. To do this, the previously mentioned distortion criterion can be used. The versions are then referenced by an index V varying from 0 to $V_{max}$.

It may be noted that the technique which has just been described does not require storage of the data corresponding to the different versions of the key image under consideration. As will be seen later, this is because decoding can be carried out with the chosen resolution and quality at the time the data are sent.

In a variant, the different versions of the key image obtained with the different resolution R and quality Q parameters can be stored on the sending server.

Figure 3:
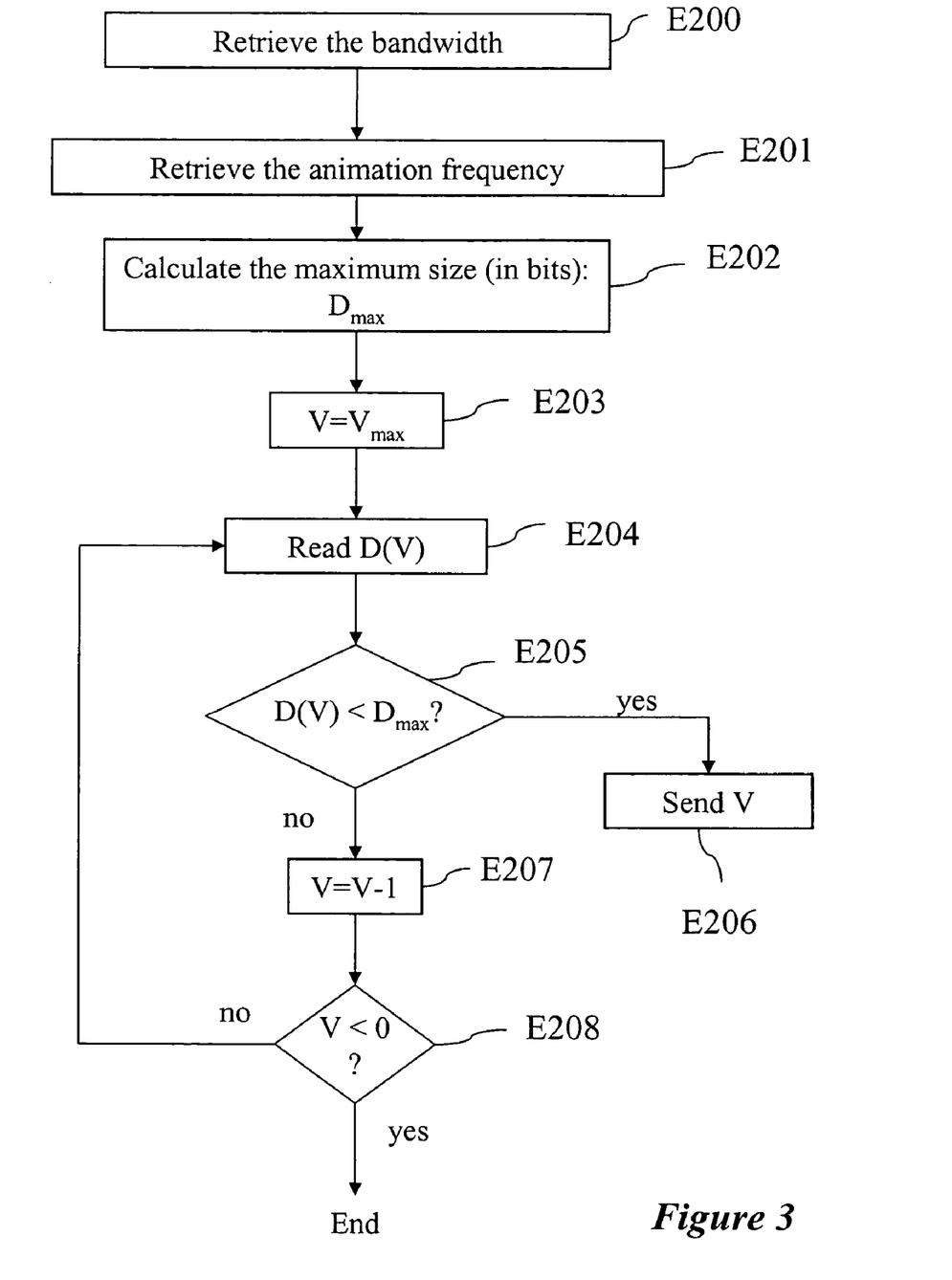
FIG. 3 describes the selection of a base version of a key image.

FIG. 3 describes in detail the method for determining the base version to be sent during the first time period, as provided during the step E9 of FIG. 1 described above.

This is because, when a key image has to be sent on the transmission channel, it must be determined which base version has to be transmitted, that is to say which representation of the key image it is wished to use. The data which constitute the base version of the key image will be designated base data and sent on the transmission channel during the first time period.

Determination of a base version starts with the step E200 of retrieving the bandwidth BW estimated during the step E4 (FIG. 1). Next, at the step E201, the animation frequency F, which is therefore the inverse of the duration of the first time period (transmission time for an image), is also retrieved. Control then passes to the step E202, during which there is calculated the maximum size $D_{max}$ of the data which can be sent on the transmission channel during the first time period, using the simple formula $D_{max}=BW/F$.

The size $D_{max}$ is therefore the maximum size which the base version of the key image to be sent on the transmission channel during the first time period can have.

The different versions of the key image are then examined in order to determine which is best adapted to the size $D_{max}$.

To do this, the step E202 is followed by the step E203 at which the current value V, which indicates the version under consideration, is initialized to the value $V=V_{max}$.

Control next passes to the step E204, during which the size D(V) of the version under consideration is read from the version table produced in accordance with the method depicted in FIG. 2.

Control next passes to the following step E205 where the size D(V) of the current version is compared with the size $D_{max}$ determined at the step E202.

If the size of the current version D(V) is greater than the size $D_{max}$, the version cannot be sent on the transmission channel because of its size. Control therefore passes to the step E207 where the version index is decremented (V=V−1).

Control next passes to the step E208 which checks that the current version was not the last version available (test if V<O).

Naturally, if the current version is the last version available, the method for determining the base version is terminated. This situation means that none of the base versions prepared by the version table could be sent during the first time period with the bandwidth estimated previously. Provision can then be made to reiterate the method (from the step E4 of FIG. 1) during a new time period. By way of a variant, sending the version with the smallest size can be envisaged.

If, on the contrary, the current version is not the last version available, control passes from the step E208 to the previously described step E204, where the size D(V) of the new current version is read.

Returning to the step E205, if it was determined that the size of the current version is less than the size $D_{max}$, this is then the situation where the current version has a sufficiently reduced size to be able to be sent on the transmission channel during the first time period.

In this case, control passes to the step E206 which corresponds to sending the base version, and more precisely the base data which define it, on the transmission channel as provided for at the step E10 of FIG. 1.

It is easily understood that the process depicted in FIG. 3 makes it possible to send the representation of the key image (or version) which is best adapted to the bandwidth during the first time period.

Figure 4:
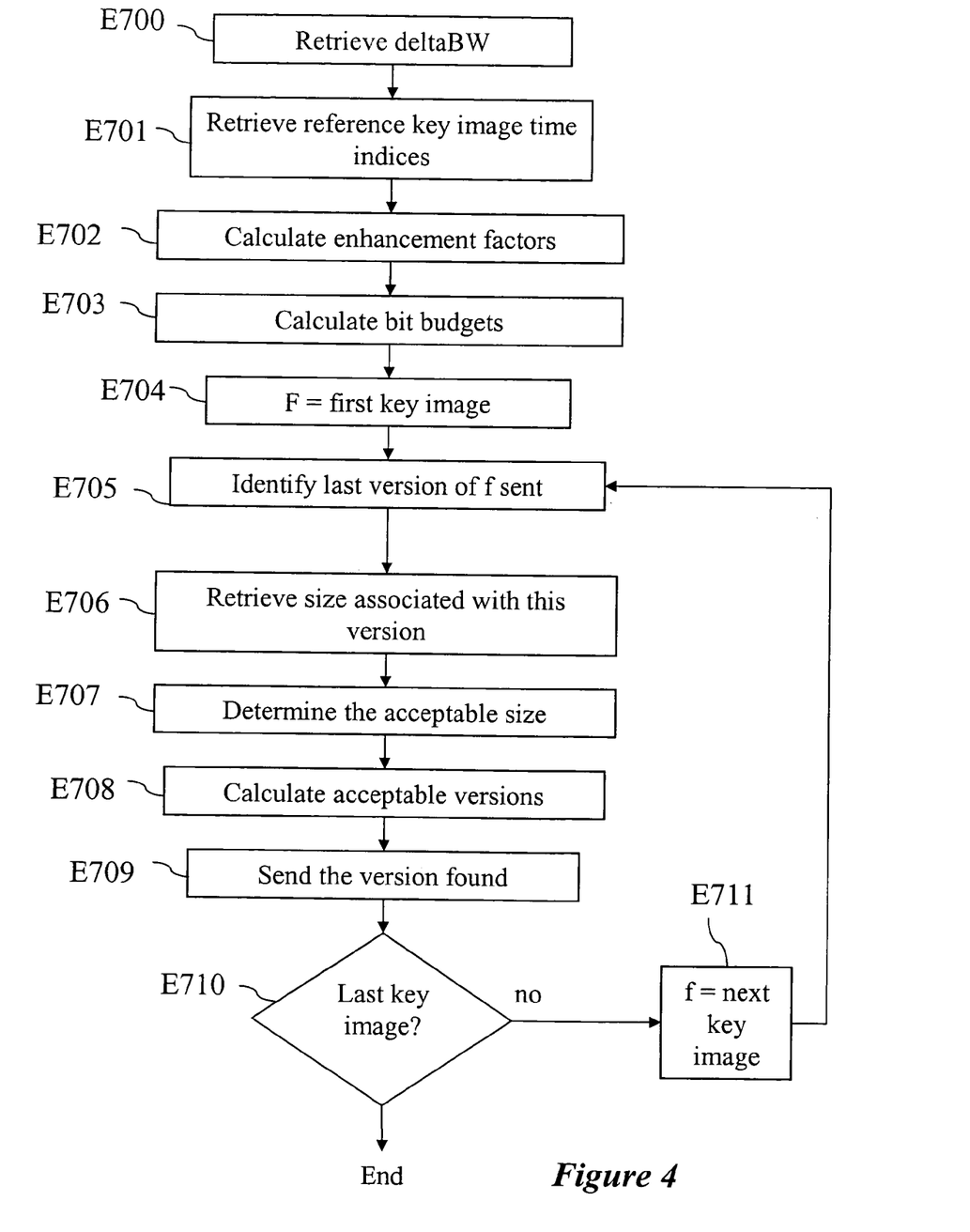
FIG. 4 describes the selection of enhancement data to be sent during a secondary data sending time interval.

FIG. 4 describes in detail the determination of the enhancement data to be sent during the step E8 of FIG. 1.

At the step E700, the value of the remaining bandwidth deltaBW evaluated during the step E7 is retrieved. This remaining bandwidth deltaBW constitutes an overall data budget which is used for transmitting enhancement information for at least one of the key images associated with the secondary image in progress, which corresponds to the interpolation parameters sent at the step E6 (FIG. 1).

In the example described here, two key images are associated with each secondary image. For example, if the secondary images are interpolation images, and if the key images $I_k$ and $I_{k+1}$ have to be displayed respectively at the times $t_k$ and $t_{k+1}$, the secondary (interpolated) image $I_t$ is determined by the general formula valid at each point with coordinates (x, y) of the image:

$$I_t(x, y) = \frac{(t - t_k)}{(t_{k+1} - t_k)} I_{k+1}(x, y) + \frac{(t_{k+1} - t)}{(t_{k+1} - t_k)} I_k(x, y).$$

The above example shows clearly that the relative effect of the key images in the associated secondary images varies according to the time proximity of the secondary image and the key image under consideration.

At the step E701, the time indices mentioned above ($t_k$, $t_{k+1}$ for the key images and t for the secondary image in progress) are retrieved.

At the step E702, an enhancement factor for each key image is determined as a function of the time indices mentioned above. The enhancement factor for a key image corresponds to the part of the remaining bandwidth (or overall budget) to be used for transmitting the enhancement data for the key image under consideration. On account of the relative effect of the key images which is mentioned above, it is advantageous that the enhancement factors depend (in a decreasing manner) on the duration separating the secondary image under consideration from the associated key image, related to the duration separating two key images.

Control then passes to the step E703 where there is calculated, for each key image associated with the secondary image in progress, the budget available for sending the enhancement data for the key image under consideration using the enhancement factor for this key image calculated at the step E702 and the remaining bandwidth deltaBW.

In the following steps, it is sought to determine the enhancement data for the key image under consideration so that their sizes correspond as well as possible to the budget which has just been determined for the key image under consideration.

Thus, at the step E704, the process is initialized by considering the first key image.

Then, at the step E705, there is retrieved, for example from the version table, a data item indicating the last version of the key image sent. Naturally, if no enhancement data for the key image has been sent yet, this version corresponds to the base version described with reference to FIG. 3.

Control next passes to the step E706, where the size of the last version sent is retrieved from the version table.

There can thus be determined at the step E707 the acceptable size for the enhanced version to be sent by the simple addition of the size of the last version sent and the budget available for the enhancement data for the key image.

It may be noted that the sizes mentioned in the version table correspond to the total size of the different representations of the images as a function of the resolution R and quality Q parameters. Conversely, the budget for each key image determined at the step E703 corresponds to the size increment from one version to another and which will be used by the enhancement data. This is why it is necessary, as described above, to add the size of the last version sent in order to be able to compare the authorized budgets with the sizes indicated in the version table.

Thus, at the step E708, there is determined the version in the version table which uses as much as possible the acceptable size determined at the preceding step. This determination of the version can be carried out by iteration in a manner analogous to that described with reference to FIG. 3 for determining the base version.

When an acceptable version is obtained by the step E708, control can pass to the step E709 during which there is sent the enhanced version thus determined, and more precisely the enhancement data which make it possible to go from the last representation sent to the acceptable version. This can be carried out for example within the context of the JPEG 2000 format.

When the enhancement data relating to the new version of the key image have been sent, processing of the enhancement data relating to the next key image associated with the secondary image under consideration in the whole of FIG. 4 can be proceeded with. To do this, it is checked at the step E710 if the key image under consideration is the last image.

If the answer is no, the next key image is moved to by means of the step E711 which ends at the previously described step E705 for identifying the last version of the new key image under consideration.

Naturally, when the last key image has been processed, the step E710 terminates the process for determining the enhancement data, which makes it possible to send them on the transmission channel during the second time period, as already described with reference to FIG. 1.

Figure 5:
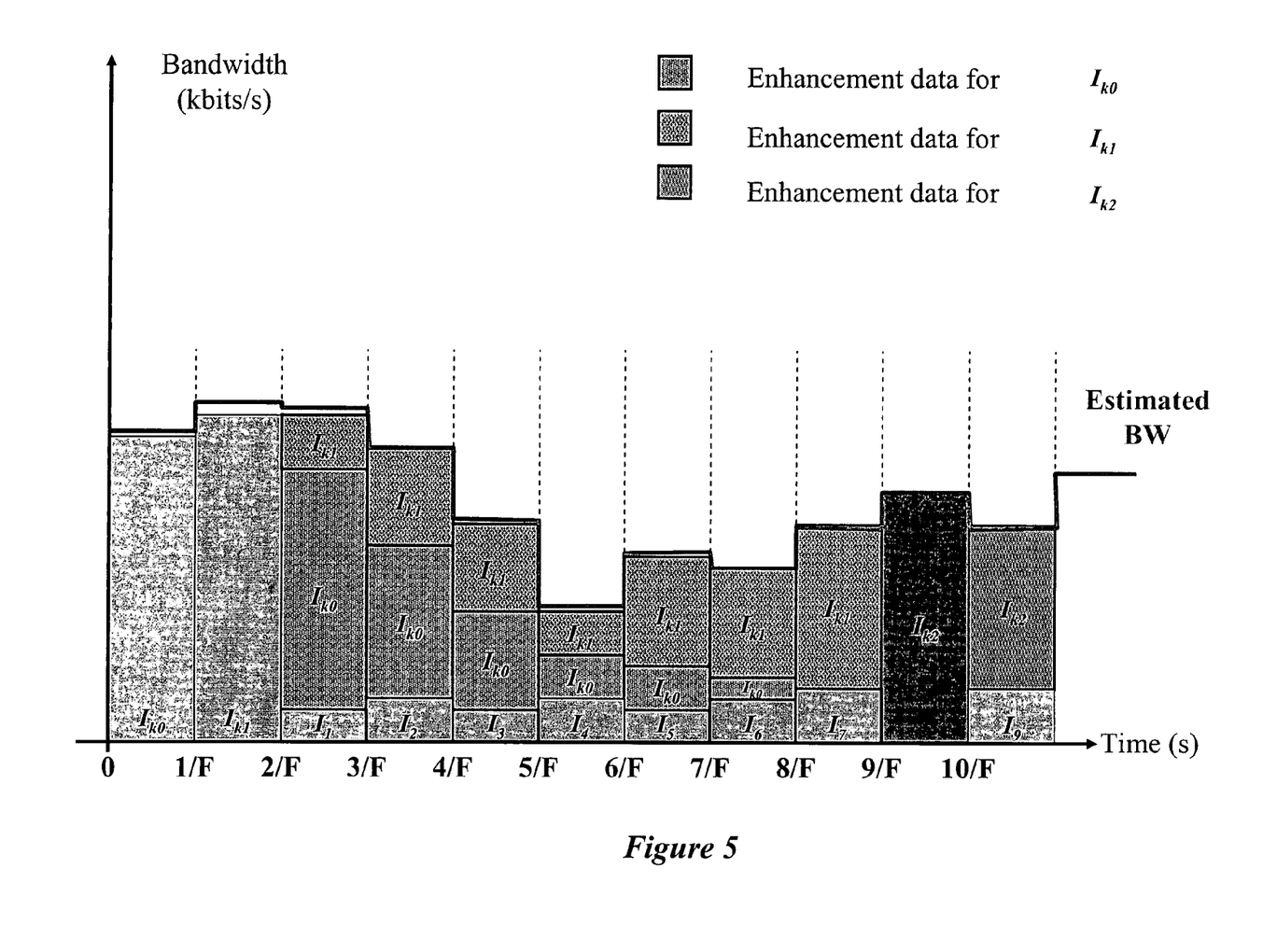
FIG. 5 describes the use of a transmission channel as resulting from the invention.

The method depicted in FIG. 1 and detailed above with reference to FIGS. 2 to 4 allows sending of the data in accordance with the diagram depicted in FIG. 5. This diagram depicts on the x-axis the successive time periods during which images are sent successively. On the y-axis, the bandwidth and the various information rates have been depicted.

Between the times 0 and 1/F, the base data relating to the key image $I_{k0}$ are sent. These base data are determined in accordance with the step E9 of FIG. 1 and the method described with reference to FIG. 3.

Between the times 1/F and 2/F, the base data relating to the key image $I_{k1}$ are sent, these also having been determined by a process such as described with reference to FIG. 3.

It may be noted that, from the time the base data of a key image have been received by the device connected to the server, this device can decode and display the base version of the key image. This is particularly advantageous in systems where display in real time or with as short a delay as possible is sought.

Between the instants 2/F and 3/F, the secondary data (here the interpolation data) of the secondary image $I_1$ are sent as provided for at the step E6 of FIG. 1. Furthermore, still in the time period or interval between 2/F and 3/F, the server sends on the transmission channel the enhancement data for the key image $I_{k0}$, as able to be determined by a process analogous to that of FIG. 4.

Still in the same time period [2/F, 3/F], the server also sends enhancement data relating to the key image $I_{k1}$.

As can be seen clearly in FIG. 5, through the use of the budgets and enhancement factors mentioned with reference to FIG. 4, the whole of the estimated bandwidth is used.

The sending of enhancement data for the key images makes it possible to improve the quality of the key images under consideration for the receiver and thus the quality of the interpolation image sent during the same time interval.

It should be noted that the combined sending, during one and the same time period, of secondary data and enhancement data for the key images continues for all the secondary data.

Furthermore it appears clearly in FIG. 5 that the use of enhancement factors (see steps E702 and E703 of FIG. 4) during the determination of enhancement data for each image makes it possible to bring up to date the supplement supplied for each key image by the enhancement data. This makes it possible to improve for each time period the different key images associated with the secondary image in progress with a weighting parallel to the importance of these key images for the secondary image in progress.

Between the instants 9/F and 10/F, the server sends the base data relating to a new key image $I_{k2}$ according to a method analogous to the sending of the preceding key images. Similarly, the combined sending of secondary data relating to the new secondary images and of enhancement data for the new key image is carried out for the following instants in a manner analogous to the instants between 2/F and 9/F, up to the next key image.

Figure 6:
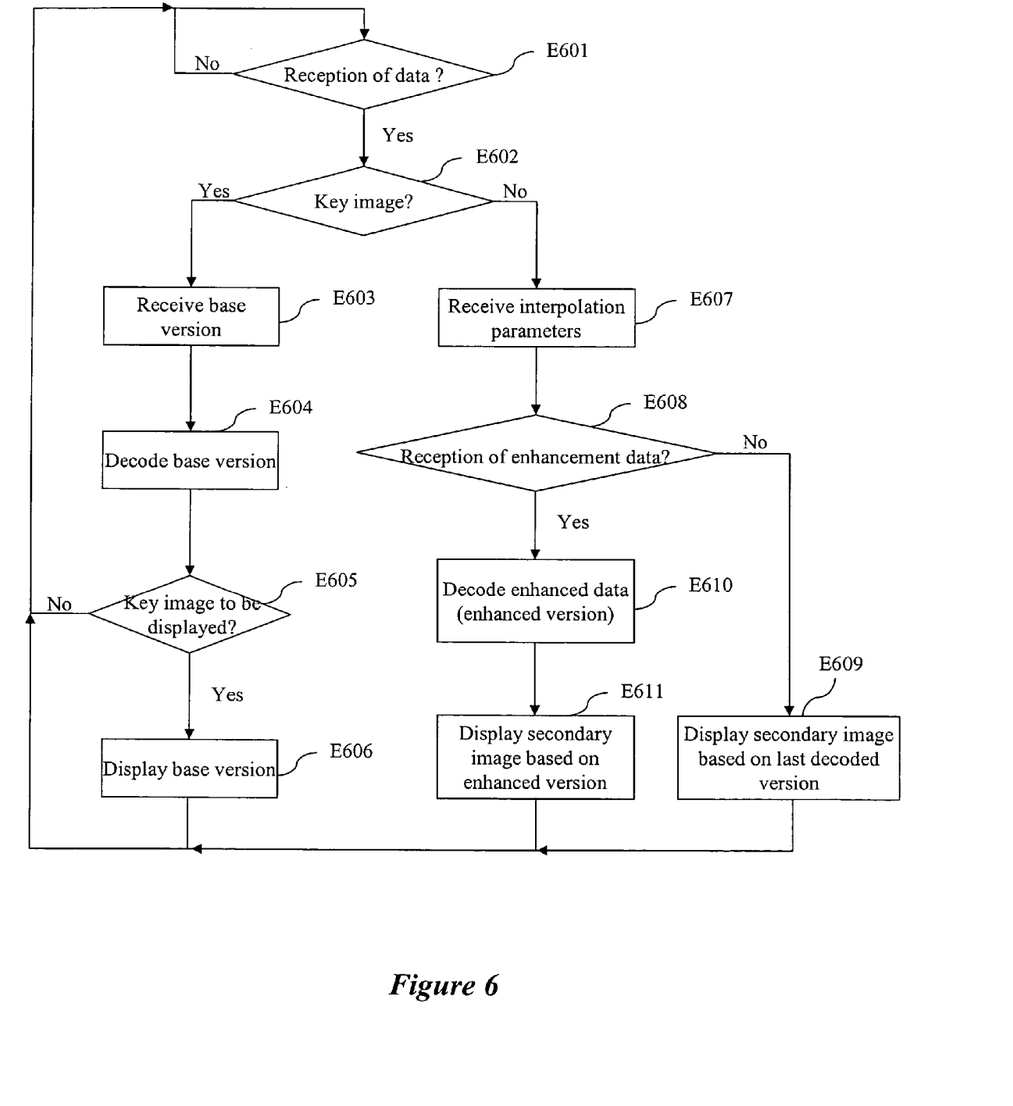
FIG. 6 describes a receiving method in accordance with the invention.

FIG. 6 shows the main steps of an example receiving method according to the invention which corresponds to the sending method described with reference to FIG. 1. This method is for example implemented within a client device connected to the same network as the previously mentioned server device. It can concern for example a microcomputer of a user who receives the animation via the Internet.

The step E601 is a step of awaiting reception of data on the transmission channel by the client device mentioned above. The step E601 is therefore repeated as long as no data is received on the transmission channel.

If data are received on the transmission channel, control passes from the step E601 to the step E602.

At the step E602, it is determined if the received data relate to the base determination of a key image, that is to say if the received data correspond to base data of a key image. If this is the case, control passes to the step E603, otherwise, control passes to the step E607.

At the step E603, the client device therefore receives the base data relating to the key image in the process of being received, which therefore correspond to the base version of this key image.

At the step E604, decoding of the base version is carried out. The base version is furthermore stored in memory.

Control then passes to the step E605 where it is determined if the key image which has just been decoded (step E604) has to be displayed. This is because, as seen previously in connection with FIG. 5, certain key images (such as the key image $I_{k0}$) have to be displayed as soon as they are received or almost as soon as they are received; conversely, other key images (such as the key image $I_{k1}$) are displayed only at a later instant determined, for example, by the metadata associated with this key image. In the latter case, the display of the key image takes place at the later specified instant, for example by an interrupt process, as is frequently used for this type of decoding and display method.

If it was determined at the step E605 that the key image had to be displayed, control then passes to the step E606 where the base version which has just been decoded is displayed. The step E601 of awaiting reception of data is then returned to.

If, at the step E605, it is determined that the key image which has just been decoded does not have to be displayed for the moment, the step E601 of awaiting reception of data is then returned to immediately, the decoded image then being in any case kept in memory.

If, at the step E602, it was determined that the current reception did not concern a key image, that is to say the received data were not the base data of a key image, then control passes to the step E607.

The step E607 consists of receiving, by means of the transmission channel, interpolation parameters for a secondary image, that is to say the secondary data which make it possible to determine the secondary image using the key images associated therewith.

Control next passes to the step E608 where it is determined if enhancement data are being received in the same time interval, normally assigned to reception of the secondary image.

If no enhancement data are received during the time interval normally assigned to reception of the secondary image, control passes to the step E609, during which the secondary image is displayed using the last decoded version of the key image and the interpolation parameters (secondary data) which have just been received.

If it is determined at the step E608 that enhancement data are being received during the interval for reception of the secondary image, control passes to the step E610 in which the data thus enhanced of the key image or images concerned will be decoded. This is because the enhancement data which have therefore been received at the step E608 supplement the base version or versions previously decoded at the step E604. The base version (obtained using the base data) and the enhancement data will therefore constitute a set of enhanced data which are decoded and kept in memory.

An enhanced version of the key image or key images associated with the secondary image in progress is thus obtained.

Control then passes to the step E611 where the secondary image in progress is displayed using the enhanced version or versions of the key image or images associated with this secondary image. The following secondary images will also be based on these enhanced versions of the key images (or on versions further enhanced by reception of new enhancement data).

Once this display has been performed, the step E601 of awaiting new data is returned to.

Figure 7:
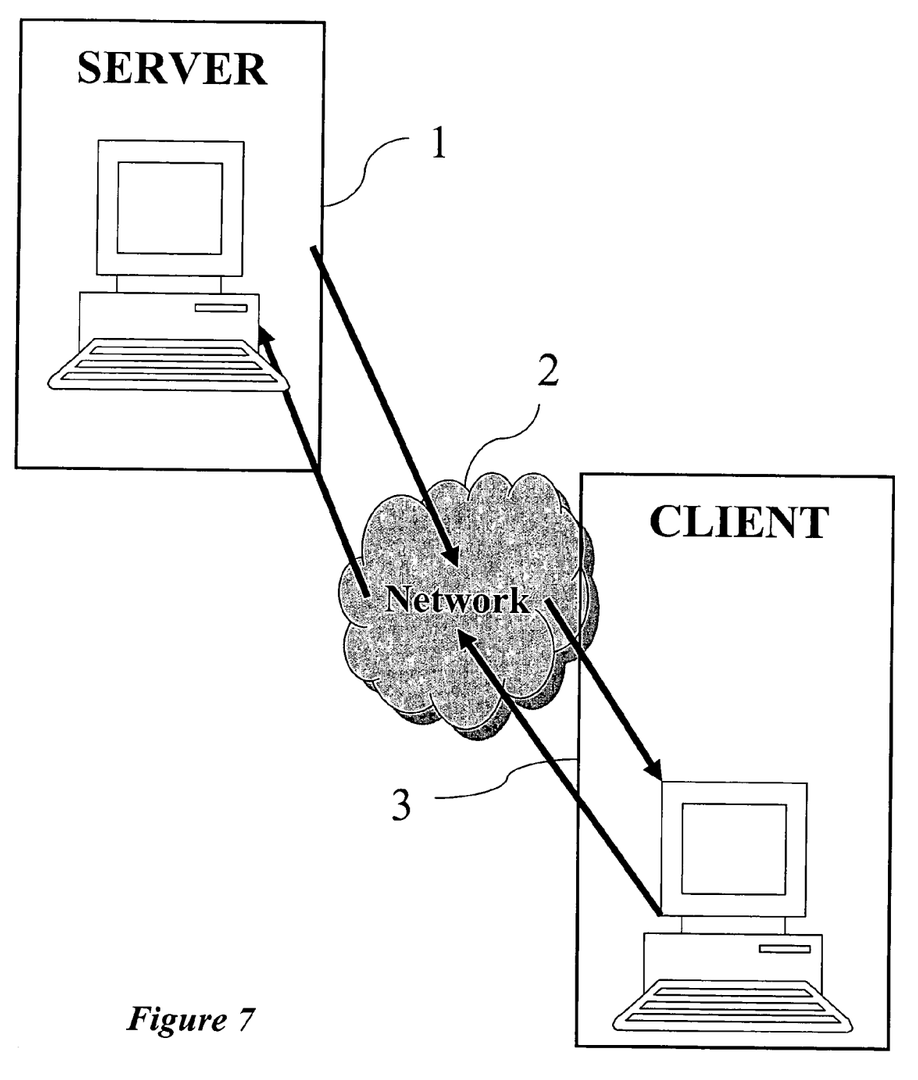
FIG. 7 describes one possible context of use of the invention.

FIG. 7 describes schematically a possible context of use of the invention.

A server 1 is connected to a communication network 2 to which a client device 3 is also connected. The communication network 2 therefore implements a transmission channel between the server 1 and the client 3.

The server 1 and the client 3 are, for example, implemented in the form of programmable apparatuses, such as microcomputers, as described below with reference to FIG. 8.

The server 1 performs the sending of an animation in accordance with the invention and as described with reference to principally FIG. 1. The client 3 receives the information sent by the server and which describe the animation it is wished to view. To do this, it uses for example a method as described with reference to FIG. 6.

Figure 8:
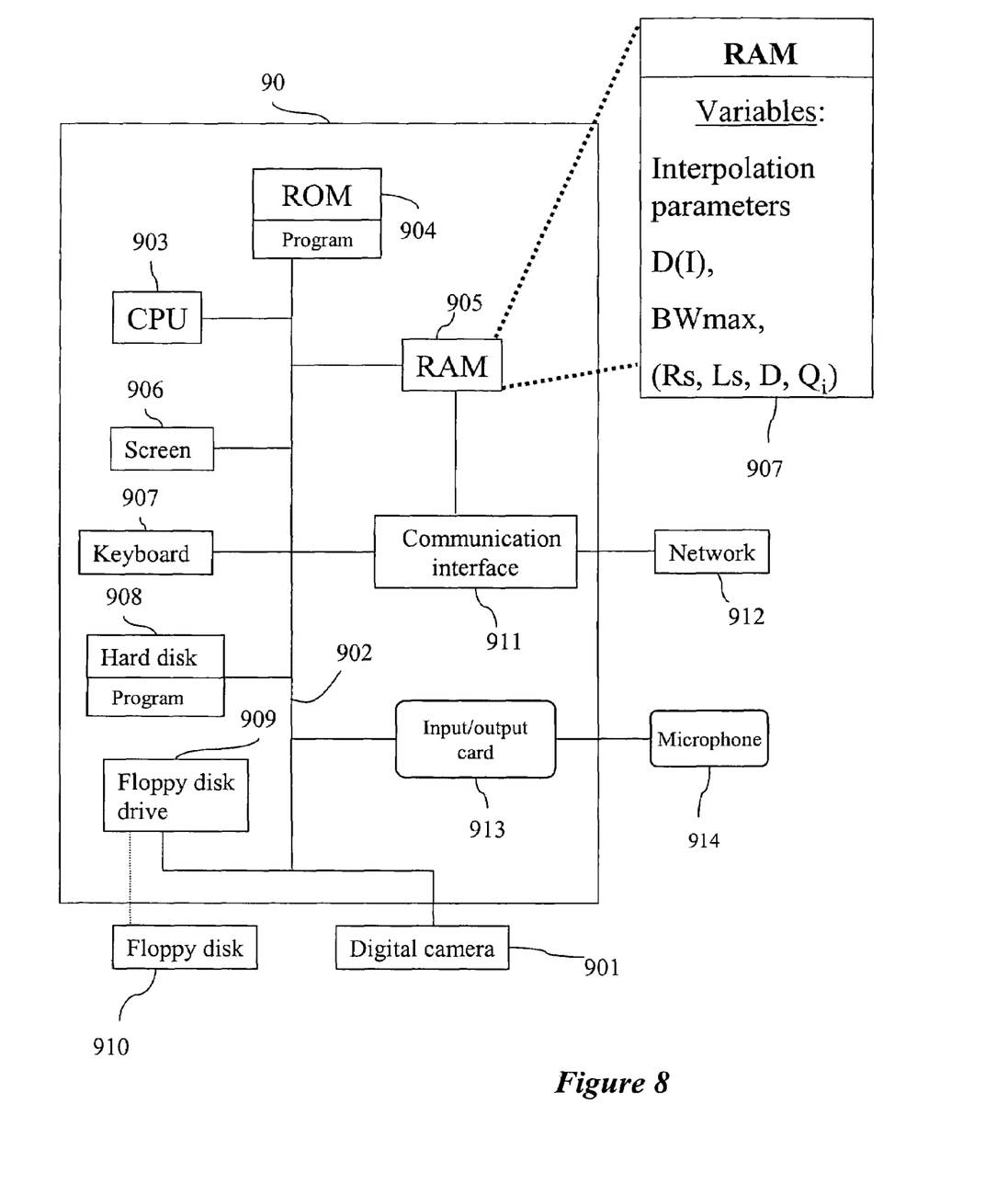
FIG. 8 describes a device for implementing the invention.

FIG. 8 describes an example device which can be used as server or client for the implementation of the invention described previously. In the example described more particularly below, the device described plays the part of the server 1 of FIG. 7 which therefore carries out the sending of the animation in accordance with the method described with reference to FIG. 1.

Each of the apparatuses described in FIG. 7 is for example a programmable apparatus of the same type as that of FIG. 8 and possesses the means which make it capable of implementing the invention.

The apparatus of FIG. 8 is thus considered to be a device capable of transmitting information which describes an animation.

According to the embodiment chosen and depicted in FIG. 8, an apparatus implementing the invention is for example a microcomputer 90 or a workstation connected to various peripherals such as, for example, a digital camera 901 (or a scanner, or a digital photographic apparatus, or any image acquisition or storage means) connected to a graphics card and supplying a digital data processing apparatus.

The apparatus 90 comprises a communication bus 902 to which the following are connected:

- a central processing unit or CPU 903 (microprocessor);
- a read only memory (or ROM) 904, comprising one or more computer programs based on the algorithms illustrated in the preceding figures;
- a random access memory (or RAM) 905 adapted to record variables, parameters and data processed during execution of the different algorithms mentioned above;
- a screen 906 making it possible to view data and/or be used as a graphical interface with the user who can interact with the programs according to the invention, by means of a keyboard 907 or any other means such as a pointing device, like for example a mouse or a light-pen;
- a hard disk 908 possibly comprising all or some of the program or programs mentioned above;
- a floppy disk drive 909 adapted to receive a floppy disk 910 and read therefrom or write thereto digital data processed or to be processed according to the invention;
- a communication interface 911 connected to a distributed communication network 912, for example the Internet, the interface being capable of sending and receiving digital data.

The apparatus also comprises an input/output card 913 connected to a microphone 914.

The communication bus 902 allows communication and interoperability between the different elements included in the microcomputer 90 or connected thereto. The representation of the bus is not limiting and, in particular, the central unit is able to communicate instructions to any element of the microcomputer 90 directly by means of another element of the microcomputer 90.

The executable code of each program allowing the programmable apparatus 90 to implement the methods according to the invention described above can be stored, for example, on the hard disk 908 or in read only memory 904 as depicted in FIG. 1.

According to a variant, the floppy disk 910 can contain data as well as the executable code of the aforementioned programs which, once read by the apparatus 90, will be stored on the hard disk 908.

In a second variant, the executable code of the programs can be received by means of the communication network 912, via the interface 911, in order to be stored in a manner identical to that described previously.

The floppy disks can be replaced by any information medium such as, for example, a compact disk (CD-ROM) or a memory card. In general terms, an information storage means, readable by a computer or a microprocessor, integrated or not with the apparatus, and possibly removable, is adapted to store one or more programs whose execution allows the implementation of the methods according to the invention. In more general terms, the program or programs can be loaded into one of the storage means of the apparatus 90 before being executed.

The central unit 903 will control and direct the execution of the instructions or portions of software code of the program or programs according to the invention, instructions which are stored on the hard disk 908 or in the read only memory 904 or else in the other aforementioned storage elements. At power-up, the program or programs which are stored in a non-volatile memory, for example the hard disk 908 or the read only memory 904, are transferred into the random access memory 905 which will then contain the executable code of the program or programs according to the invention, as well as registers for storing the variables and parameters necessary for implementing the invention.

It should be noted that the device according to the invention can also be a programmed apparatus. This apparatus then contains the code of the computer program or programs for example fixed in an Application Specific Integrated Circuit (ASIC).

What is claimed is:

1. A method for sending, between a first device and a second device over a transmission channel, at least one key image to be transmitted via the transmission channel during a first time interval and a secondary image calculated using said at least one key image and to be transmitted via transmission channel during a second time interval, said at least one key image being defined at least partly by base data and the secondary image being defined by secondary data, comprising the steps of:

sending the base data from the first device to the second device via the transmission channel during the first time interval;

determining enhancement data for said at least one key image according to an available bandwidth of the transmission channel and the amount of secondary data to be transmitted; and sending the secondary data and the enhancement data for said at least one key image from the first device to the second device via the transmission channel during the second time interval.

2. A method according to claim 1, further comprising the steps of:
   estimating the available bandwidth of the transmission channel during the first time interval in order to determine a first amount of data to be transmitted; and
   extracting the base data of the at least one key image so that the size of the base data is less than or equal to said first amount.

3. A method according to claim 2, wherein said extraction step comprises the following steps:
   selecting, by means of a table containing the size of the base data as a function of at least one parameter, at least one value of the parameter such that the size associated by the table is less than or equal to said first amount; and
   extracting the base data using at least said value.

4. A method according to claim 1, further comprising the steps of:
   estimating the available bandwidth of the transmission channel during the second time interval in order to determine a second amount of data to be transmitted;
   determining the available data budget by subtracting the size of the secondary data from said second amount; and
   extracting the enhancement data for said at least one key image so that the size of the enhancement data is less than or equal to the available budget.

5. A method according to claim 1, wherein the secondary data are interpolation parameters.

6. A method according to claim 1, wherein a first key image and a second key image are transmitted during the first time interval.

7. A method according to claim 6, wherein the first key image is intended to be displayed at a first instant, the second key image is intended to be displayed at a second instant separated from the first instant by a first time duration, the secondary image is intended to be displayed at a third instant separated from the first instant by a second time duration smaller than the first time duration, and first enhancement data relating to the first key image and second enhancement data relating to the second key image are determined so that the size ratio between the first and second enhancement data depends on the ratio of the second time duration to the first time duration.

8. A method according to claim 1, wherein the at least one key image and the secondary image define an animation.

9. A method according to claim 8, wherein the animation comprises several secondary images between a first key image and a second key image.

10. A method according to claim 1, wherein the at least one key image and the secondary image are multi-resolution images with several quality levels.

11. A computer readable storage medium on which is stored a computer program that, when executed by a computer, performs the method according to claim 1.

12. A method for a device for decoding at least one key image and a secondary image, comprising the steps of:
   during a first time interval, receiving, from an apparatus, base data defining said at least one key image;
   decoding the base data so as to generate a first version of said at least one key image;
   during a second time interval, receiving, from the apparatus, enhancement data for said at least one key image and secondary data defining the secondary image using said at least one key image; and
   verifying if enhancement data for said at least one key image has been received during the second time interval,
   wherein, in a case of a positive verification:
      combining the base data and the enhancement data into enhanced data; and
      decoding the secondary data so as to generate said secondary image using the enhanced data;
   and wherein, in a case of a negative verification:
      decoding the secondary data so as to generate said secondary image using the first version of said at least one key image.

13. A decoding method according to claim 12, further comprising, between the steps of decoding the base data to generate the first version of the at least one key image and combining the base data and the enhancement data into enhanced data, performing a step of displaying said first version of the at least one key image.

14. A decoding method according to claim 12, further comprising a step of decoding the enhanced data so as to generate a second version of said at least one key image, and in that the decoding of the secondary data so as to generate said secondary image is based on said second version.

15. A computer readable storage medium on which is stored a computer program that, when executed by a computer, performs the method according to claim 12.

16. A device for sending to an apparatus via a transmission channel at least one key image to be transmitted via the transmission channel during a first time interval and a secondary image calculated using said at least one key image and to be transmitted via the transmission channel during a second time interval, said at least one key image being defined at least partly by base data and the secondary image being defined by secondary data, comprising:
   first sending means for sending the base data to the apparatus via the transmission channel during the first time interval;
   determining means for determining enhancement data for said at least one key image according to an available bandwidth of the transmission channel and the amount of secondary data to be transmitted; and
   second sending means for sending the secondary data and the enhancement data for said at least one key image from the device to the apparatus via the transmission channel during the second time interval.

17. A device for decoding at least one key image and a secondary image, comprising:
   first receiving means for receiving, from an apparatus via a transmission channel, during a first time interval, base data defining said at least one key image;
   first decoding means for decoding the base data so as to generate a first version of said at least one key image;
   second receiving means for receiving, from the apparatus via the transmission channel, during a second time interval, enhancement data for said at least one key image and secondary data defining the secondary image using said at least one key image; and
   verifying means for verifying if enhancement data for said at least one key image has been received during the second time interval,
   wherein, in a case of a positive verification by the verifying means:
      a combining means combines the base data and the enhancement data into enhanced data; and
      a second decoding means decodes the secondary data so as to generate said secondary image using the enhanced data, and wherein in a case of a negative verification by the verifying means:
a third decoding means decodes the secondary data so as to generate said secondary image using the first version of said at least one key image.

18. A system comprised of a sending device and a decoding device,
said sending device being a device for sending via a transmission channel to said decoding device at least one key image to be transmitted via the transmission channel during a first time interval and a secondary image calculated using said at least one key image and to be transmitted via the transmission channel during a second time interval, said at least one key image being defined at least partly by base data and the secondary image being defined by secondary data,
said sending device comprising:
first sending means for sending the base data to the decoding device via the transmission channel during the first time interval;
determining means for determining enhancement data for said at least one key image according to an available bandwidth of the transmission channel and the amount of secondary data to be transmitted; and
second sending means for sending the secondary data and the enhancement data for said at least one key image to the decoding device via the transmission channel during the second time interval,
and said decoding device being a device for decoding at least one key image and a secondary image, said decoding device comprising:
first receiving means for receiving, from the sending device via the transmission channel, during the first time interval, the base data defining said at least one key image;
first decoding means for decoding the base data so as to generate a first version of said at least one key image;
second receiving means for receiving, from the sending device via the transmission channel, during the second time interval, the enhancement data for said at least one key image and the secondary data defining the secondary image using said at least one key image; and
verifying means for verifying if enhancement data for said at least one key image has been received during the second time interval,
wherein, in a case of a positive verification by the verifying means:
a combining means combines the base data and the enhancement data into enhanced data; and
a second decoding means decodes the secondary data so as to generate said secondary image using the enhanced data,
and wherein in a case of a negative verification by the verifying means:
a third decoding means decodes the secondary data so as to generate said secondary image using the first version of said at least one key image.

19. A method in a system comprised of a sending device and a decoding device,
said sending device for sending via a transmission channel to said decoding device at least one key image to be transmitted via the transmission channel during a first time interval and a secondary image calculated using said at least one key image and to be transmitted via the transmission channel during a second time interval, said at least one key image being defined at least partly by base data and the secondary image being defined by secondary data,
said sending device performing the steps of:
sending the base data to the decoding device via the transmission channel during the first time interval;
determining enhancement data for said at least one key image according to an available bandwidth of the transmission channel and the amount of secondary data to be transmitted; and
sending the secondary data and the enhancement data for said at least one key image to the decoding device via the transmission channel during the second time interval,
and said decoding device for decoding at least one key image and a secondary image, said decoding device performing the steps of:
during the first time interval, receiving, from the sending device via the transmission channel, the base data defining said at least one key image;
decoding the base data so as to generate a first version of said at least one key image;
during the second time interval, receiving, from the sending device via the transmission channel, the enhancement data for said at least one key image and the secondary data defining the secondary image using said at least one key image; and
verifying if enhancement data for said at least one key image has been received during the second time interval,
wherein, in a case of a positive verification by the verifying step:
combining the base data and the enhancement data into enhanced data; and
decoding the secondary data so as to generate said secondary image using the enhanced data,
and wherein in a case of a negative verification by the verifying step:
decoding the secondary data so as to generate said secondary image using the first version of said at least one key image.

* * * * *

UNITED STATES PATENT AND TRADEMARK OFFICE
CERTIFICATE OF CORRECTION

PATENT NO.         : 7,426,305 B2  
APPLICATION NO.    : 11/049978  
DATED              : September 16, 2008  
INVENTOR(S)        : Franck Denoual et al.

Page 1 of 1

It is certified that error appears in the above-identified patent and that said Letters Patent is hereby corrected as shown below:

<u>COLUMN 13</u>:
        Line 18, "describe" should read -- describes --.

<u>COLUMN 16</u>:
        Line 20, "and in that" should read -- wherein --.

Signed and Sealed this

Tenth Day of March, 2009

JOHN DOLL  
*Acting Director of the United States Patent and Trademark Office*